March 21, 1939.　　T. A. SOLBERG　　2,151,053
ABSORPTION DEVICE
Filed March 15, 1937
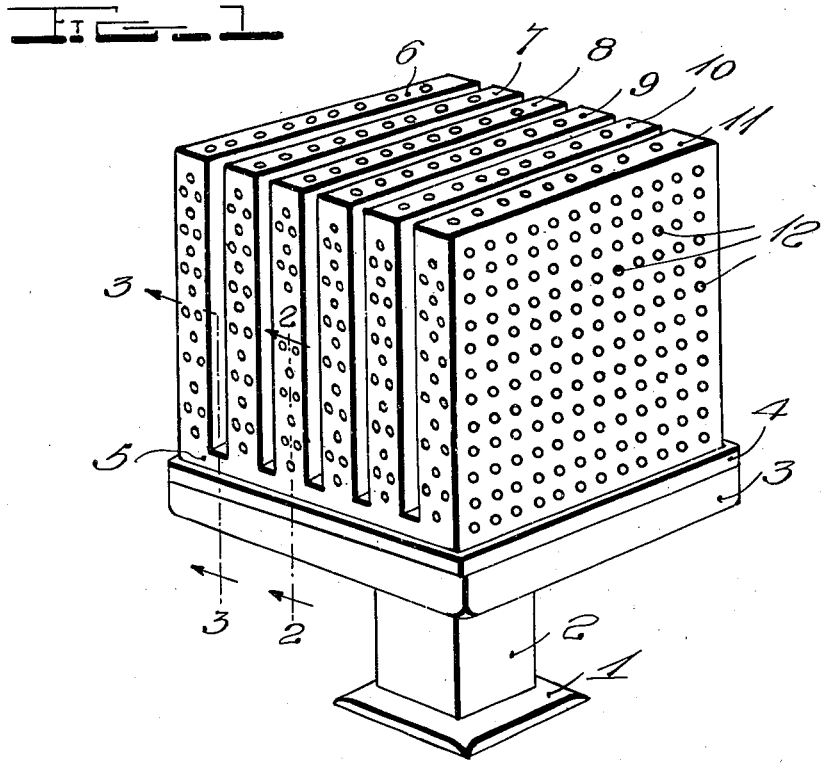
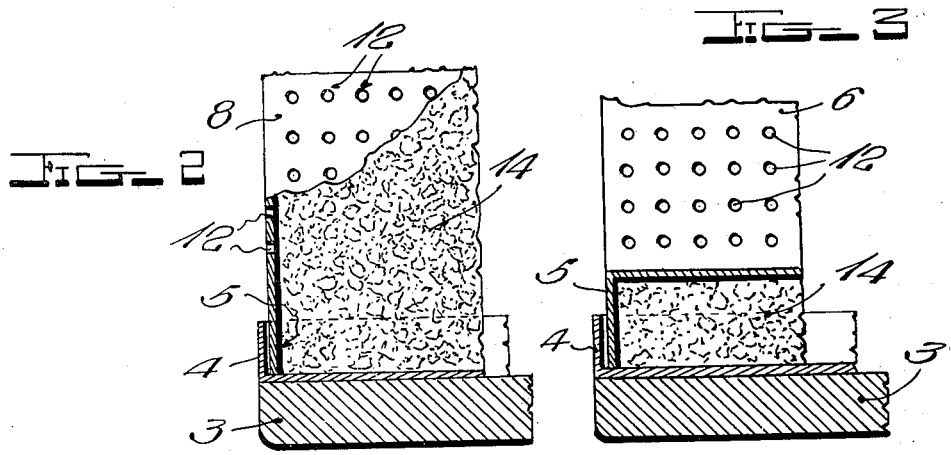
INVENTOR.
Thorwald A. Solberg,
BY John D. Brady
ATTORNEY.

Patented Mar. 21, 1939

2,151,053

UNITED STATES PATENT OFFICE 2,151,053

ABSORPTION DEVICE

Thorvald A. Solberg, Washington, D. C.

Application March 15, 1937, Serial No. 131,105

2 Claims. (Cl. 183—4)

My invention relates broadly to apparatus for preventing the tarnishing of silver and other metals when stored in vaults or cabinets or displayed in showcases or upon a sideboard or table in the home.

One of the objects of my invention is to provide a compact container for material having high absorptive properties for gases present in the atmosphere which tend to attack and tarnish silver and other metals, the container being adapted to be mounted in proximity to the silver or other metal being protected.

Still another object of my invention is to provide a perforate wall construction in a portable container serving as an enclosure for a composition material having a high degree of absorptive power for gases which tend to detrimentally attack silver and other metals and through which the gases may be absorbed by the absorbent material.

A further object of my invention is to provide a construction of gas absorber for protecting silver and other metal from the detrimental attacks of tarnishing and oxidizing gases in which an absorbent material is enclosed in a perforate wall container through which the detrimental gases are circulated.

Other and further objects of my invention reside in the apparatus for protecting silverware and other metals as set forth more fully in the specification hereinafter following by reference to the accompanying drawing in which:

Figure 1 is a perspective view of one construction of absorber embodying my invention; Fig. 2 is a fragmentary transverse sectional view taken on line 2—2 of Fig. 1; and Fig. 3 is a fragmentary transverse sectional view on line 3—3 of Fig. 1.

Ordinary household silverware and other objects of silver, silver plated ware, etc., become tarnished when exposed to the atmosphere for long periods. This tarnishing or oxidation also occurs to silver stored in vaults and in display or show cases. The purpose of the present invention is to prevent, or, in large measure, retard this destructive and unsightly corrosion. The tarnishing is caused principally by the presence in the air of small quantities of various sulphurous gases, of which the most prevalent are hydrogen sulphide and sulphur dioxide.

The method of preventing attack on the silver or other metals consists of providing a powerful absorbing agent in the vicinity of the exposed silver or metal. The chemical used has a strong affinity for sulphur in the various gaseous compounds existing in most air.

The use of dry chemicals in a container having perforate wall construction through which the tarnishing and oxidizing gases may circulate has proven highly practical. This method lends itself best to household applications. I have found that the best materials for this purpose are activated carbon granules impregnated with chromic acid. To this can be added small amounts of ammonium nitrate crystals or other ammonia compounds and lead salts. Caustic kaolin and activated charcoal in granular form mixed together will also accomplish the desired result. The basic feature of the container is to present the largest possible surface to promote absorption of the responsible gases.

Referring to the drawing in more detail, reference character 1 designates the supporting base for the absorber illustrated in Fig. 1. The supporting base 1 carries a pedestal 2 on which the laterally extending shelf or support 3 is mounted. A tray 4 having upstanding peripheral edges is removably supported on the horizontal shelf or support 3. The tray 4 provides a mounting means for the bottom of the container 5. The container 5 has a multiplicity of vertically projecting sections 6, 7, 8, 9, 10 and 11, each of which has wall portions which extend parallel one to the other with a passageway therebetween for the circulation of air. The walls of the sections 6, 7, 8, 9, 10 and 11 are perforated to allow the gases in the atmosphere to be absorbed through the walls of the container by the absorbent material mounted within the container. These perforations have been indicated generally at 12 in the top and side walls of the container. Referring to Figs. 2 and 3, it will be observed that the upstanding sections 6, 7, 8, 9, 10 and 11 are substantially comb-like in their arrangement with respect to the base portion of the container 5. Throughout the interior of the sections 6, 7, 8, 9, 10 and 11, and throughout the base portion of the container 5 which is common to all of the sections, I provide a charge of activated carbon granules impregnated with chromic acids and including small amounts of ammonium nitrate crystals. I have indicated the absorbent material generally by reference character 14. The fact that the base portion of the container 5 is open and forms the base for the comb-like construction of the container, and is closed when the container 5 is mounted in a vertical position within tray 4, allows the absorbent material to be readily discharged from the container and renewed readily whenever required. This form of construction of the apparatus of my invention is particularly adapted for mounting on a sideboard, in a display case, or in a vault.

The gas absorbing material employed in the device of my invention may be renewed from time to time when necessary to provide a reactivated quantity of absorbent material.

I have described my invention in a preferred embodiment. I realize, however, that modifications of my invention may be made and I desire that it be understood that I intend no limitations upon my invention other than those which may be imposed by the appended claims.

What I claim as new and desire to secure by Letters Patent of the United States is as follows:

1. A device for protecting silver and other metals against tarnishing gases comprising a support having upwardly extending edges, and a container and gas absorbent material therein carried by said support; said container comprising a base portion open at the bottom and mounted between the upwardly extending edges of said support, said support providing a closure for the base portion of said container, and a plurality of vertically projecting container sections opening from said base portion, said container sections being perforate throughout the surfaces thereof for the admission of tarnishing gases into said gas absorbent material within said container.

2. A device for use in protecting silver and other metals against tarnishing gases comprising a support having upwardly extending edges, and a container for gas absorbent material carried by said support; said container comprising a base portion open at the bottom and a plurality of upwardly extending perforated box-like sections opening from said base portion, said device being invertible and said support being removable for opening said container, whereby said container may be filled or refilled with gas absorbent material.

THORVALD A. SOLBERG.